March 12, 1946.     A. F. SANDERS     2,396,347
VALVE OF INTERNAL-COMBUSTION ENGINE
Filed Sept. 8, 1943
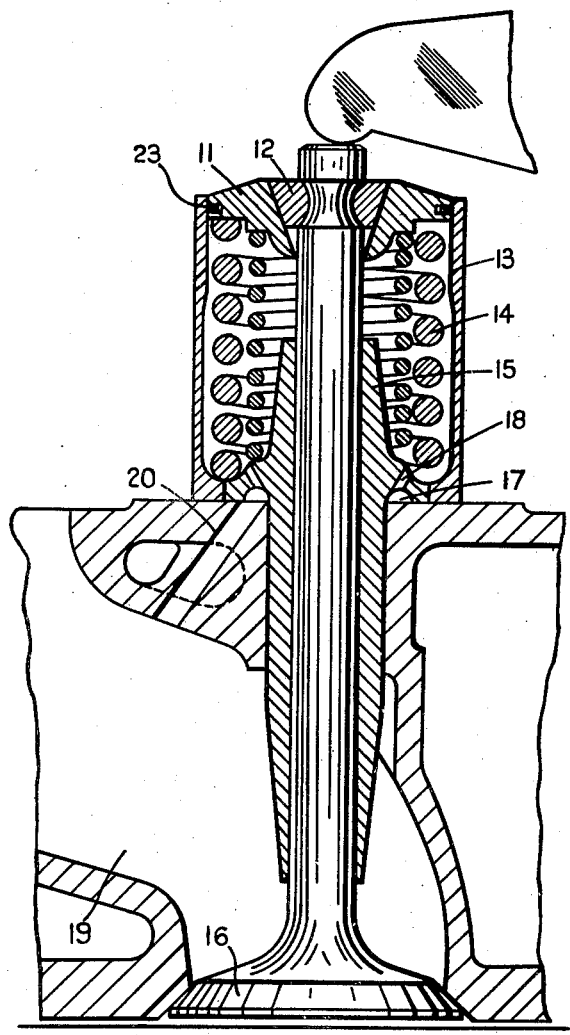
INVENTOR:
ARTHUR F. SANDERS Patented Mar. 12, 1946

2,396,347

UNITED STATES PATENT OFFICE 2,396,347

VALVE OF INTERNAL-COMBUSTION ENGINES

Arthur Freeman Sanders, Leeds, England

Application September 8, 1943, Serial No. 501,583
In Great Britain October 21, 1942

2 Claims. (Cl. 123—188)

This invention relates to internal-combustion engines and particularly to such as are adapted to operate with a relatively-high supercharge.

In the latter case there is a tendency for the inlet valve, when of the poppet type, to be lifted off its seat by the supercharge pressure in the induction passage, and to obviate this tendency abnormally strong valve springs have to be used, which, of course, have the disadvantage of stressing the valve gear in an unsatisfactory manner. Furthermore, very strong springs have to be used for the exhaust valves when of the poppet type.

My main object is to avoid this difficulty in a very simple manner.

A further object is to provide a poppet valve, of an internal-combustion engine, with means remote from the valve head against which a fluid pressure is applied to bias the valve towards the closing position.

These and other objects and advantages of the invention will be better understood if attention be paid to the following description.

The single figure of the accompanying drawing is a sectional elevation of the inlet valve of a supercharged internal-combustion engine according to the invention.

In the construction shown, for a fuel-injection engine, the ordinary inlet valve spring abutment, which is usually retained in position by a split cotter engaged in a peripheral groove of the valve stem near the extremity thereof and having a frusto-conical outer surface, is replaced by a plunger 11 which may be secured by a similar form of split cotter 12, the plunger working in a cylinder 13 which surrounds the valve spring 14 and the end of the valve stem guide 15 remote from the valve head 16. The valve stem guide has an annular groove 17 in it communicating by a plurality of passages 18 with the interior of the cylinder 13. This annular groove is connected with the induction passage 19 by a duct 20 such that the boost pressure obtaining in the induction passage is at all times applied to the plunger 11 to assist the valve spring in urging the valve in the closing direction and to oppose the action of the boost pressure, on the head 16 of the valve, which tends to unseat the valve.

Obviously, by the use of a plunger 11 of an area equal to that of the valve head 16, the supercharge pressure on the latter can be exactly balanced. With a plunger of less diameter stronger valve springs will be required, and, conversely, with a plunger of greater diameter weaker valve springs will be satisfactory. I prefer that only a light spring should be used, this being necessary for starting purposes.

The plunger, as stated, may be secured by the known form of split cotter 12, the plunger having a frusto-conical bore where it surrounds the valve stem to be engaged by the cotter. At its outside periphery it is preferably grooved to carry an appropriate sealing ring or other form of packing 23.

Furthermore, it will be evident that the same principle may with advantage be applied to poppet exhaust valves. At the present time valve spring design plays a very important part in the permissible speed of a poppet-valve engine.

Thus, by means of the invention, as regards a poppet inlet valve of a supercharged internal-combustion engine, the supercharge pressure on the valve head can be balanced to any desired degree, thereby allowing considerable latitude in the choice of valve spring.

What I claim as my invention and desire to secure by Letters Patent of the United States is:

1. A poppet valve for an internal combustion engine for operation with a supercharged gas inlet supply, a valve spring located within an adjacent cylindrical bore, said valve carrying remote from its head, a plunger working in said cylinder bore of approximately the same area as the valve head and against which said supercharge pressure is directly applied to balance to a greater or less extent that applied to the valve head, said plunger having atmospheric pressure applied to its remote face, and serving to transmit to said valve the thrust of the valve spring disposed in the cylinder bore so as to be enclosed, and means placing the said cylinder bore in communication with said inlet passage.

2. A poppet valve for an inlet passage for a supercharged internal-combustion engine, a guide for said valve extending through one wall of the inlet passage, a chamber having a cylindrical bore surrounding the stem of the valve and the outer end of said guide, a plunger working in said cylinder bore towards the outer end of said chamber, said plunger carried by the valve stem remote from its head, means securing said plunger to the valve stem, valve springs in said chamber acting on said plunger to bias the valve in the closing direction, and means placing the interior of said chamber in communication with the interior of said inlet passage whereby the boost pressure is directly applied to said plunger to balance the pressure applied to the valve head, said plunger having atmospheric pressure applied to its remote face, said plunger as an abutment serving to transmit to said valve the thrust of the valve spring disposed in the chamber.

ARTHUR FREEMAN SANDERS.